United States Patent
Gohara et al.

(10) Patent No.: US 6,267,358 B1
(45) Date of Patent: Jul. 31, 2001

(54) LOW PRESSURE DROP INLET FOR HIGH VELOCITY ABSORBERS WITH STRAIGHT TANKS

(75) Inventors: Wadie F. Gohara, Barberton, OH (US); William H. Hall, Missouri City, TX (US); George B. Watson, North Canton, OH (US)

(73) Assignees: The Babcock & Wilcox Company; McDermott Technologies Inc.; Hudson Products Corporation, all of New Orleans, LA (US)

( * ) Notice: Subject to any disclaimer, the term of this patent is extended or adjusted under 35 U.S.C. 154(b) by 0 days.

(21) Appl. No.: 09/336,412

(22) Filed: Jun. 18, 1999

(51) Int. Cl.$^7$ ........................................ B01F 3/04
(52) U.S. Cl. .................. 261/110; 261/113; 261/117; 261/DIG. 9
(58) Field of Search ..................... 261/109, 110, 261/111, 113, 117, DIG. 9; 96/326

(56) References Cited

U.S. PATENT DOCUMENTS

| | | | |
|---|---|---|---|
| 2,868,696 | * | 1/1959 | Skinner ................................. 261/113 |
| 4,263,021 | * | 4/1981 | Downs et al. ........................ 261/113 |
| 5,281,402 | | 1/1994 | Gohara et al. ....................... 423/210 |
| 5,403,523 | | 4/1995 | Strock et al. ........................ 261/111 |
| 5,558,818 | | 9/1996 | Gohara et al. ........................ 261/17 |
| 5,648,022 | | 7/1997 | Gohara et al. ........................ 261/17 |

FOREIGN PATENT DOCUMENTS

| 1211503 | * | 11/1970 | (GB) | .................................. 261/117 |
| WO 99/40998 | | 8/1999 | (WO) . | |

* cited by examiner

Primary Examiner—David A. Simmons
Assistant Examiner—Robert A. Hopkins
(74) Attorney, Agent, or Firm—Robert J. Edwards; Eric Marich

(57) ABSTRACT

A low pressure drop inlet arrangement for an absorber having straight walls has a perforated tray positioned above the gas inlet opening between the walls of the absorber. A ring around the outer edge of the tray lacks perforations, or the perforations are covered. A drip ledge may be positioned on the bottom of the tray around the inner edge of the non-perforated ring. Baffles are positioned over the tray as well. The baffles may extend between the walls of the absorber, or they may only occupy the space over the perforations in the tray and the size of the tray perforations may be varied to control the overall pressure drop. An absorber made in accordance with the invention experiences a low pressure drop at the gas inlet opening.

16 Claims, 4 Drawing Sheets

LOW PRESSURE DROP INLET FOR HIGH VELOCITY ABSORBERS WITH STRAIGHT TANKS

FIELD AND BACKGROUND OF THE INVENTION

1. Field of the Invention

The present invention relates generally to the field of flue gas desulfurization absorbers and, in particular, to a new and useful absorber arrangement for use in high velocity absorbers having straight, non-flared tank walls.

2. Description of the Related Art

Commercialization and development of high velocity absorbers is pursued because of the economic advantages they offer such as lower capital cost, less real estate requirements, shorter and more compact absorbers, and improved $SO_2$ removal efficiency. On the other hand, high velocity has some disadvantages such as increased resistance to gas flow and increased sensitivity of the system to changes in the hydraulic behavior of the gas and liquid phases. Physical model studies show that the gas velocity through the inlet of the absorber affects gas distribution in the absorber and reflects on the performance and behavior of the absorption zone and mist eliminator.

Regardless of the physical shape of the absorber, the resistance to gas flow is categorized as either useful resistance or parasitic resistance. Useful resistance is converted directly and entirely into scrubbing efficiency and participates in gas redistribution such as the absorption zone pressure drop. Parasitic resistance is expended to conduct the gas through the absorber confines without effective participation in the chemical process. The inlet and outlet resistances are good examples of this type of resistance. The use of turning vanes or other gas distribution devices is a simple solution to reduce outlet resistance. However, the inlet pressure drop is not easy to reduce because it affects the gas and the scrubbing liquid interaction throughout the absorber.

Traditional absorber inlets vary in shape and size but the shape of the inlets is basically the same. FIG. 1 shows the commonly offered inlet design (without protective awning). In this design, the liquid flowing off the absorber walls 12 or sprayed by nearby spray headers, falls into the inlet 14 and forms a solid growth known as "elephant ears". To overcome this problem and as shown in FIG. 2, protective intrusive awnings 16 were placed on top of the inlet 14 (see U.S. Pat. No. 5,281,402 to Gohara et al.). The awning diverted the contact point between the hot gas and the liquid curtain flow into the center of the absorber. Elephant ears formation is averted because gas humidification occurs in an area where there is minimum contact between the hot gas and the solid surfaces. This design has been proven functional at the traditional gas velocities and when the spray zone resistance is large enough to affect even distribution before the gas reached the mist eliminator further up in wall 12. As the gas velocity increases, however, the curtain resistance adds significantly to the overall system parasitic pressure drop and distortions to gas flow pattern becomes more critical.

While the liquid curtin is needed to humidify and help gas redistribution, it has two significant drawbacks. It significantly increases the inlet pressure drop compared to a no awning inlet, and it distorts the flow pattern as the gas rises through the absorber.

In a new generation of high velocity absorbers, gas velocity is set between 15 and 20 feet per second. Minor distortion in the gas flow pattern results in localized high gas velocities approaching or exceeding the critical velocity of the mist eliminator and may result in functional failure of the mist elimination device.

To overcome the negative effects of high gas velocity in the inlet, one could increase the inlet's flow area and limit the gas velocity to the conventional 3,000 feet per minute. This solution, while simple and practical, will result in a larger inlet aspect ratio and increases the absorber height. An increase in absorber height minimizes the advantages gained by high velocity scrubbing. Other options include advanced low pressure drop gas inlets for the new generation of high velocity absorbers, or the use of available means within the system to redistribute the gas flow without significant increase in inlet resistance.

A current inlet design of The Babcock & Wilcox Company requires the installation of the protective awning 16 on top of the inlet 14 to deflect the slurry away from the hot flue gas flow and prevent the deposition of solids at the wet/dry interface. However, at high absorber gas velocity, obstruction of the gas path by the high density liquid curtain deflects the gas to the sides causing a momentary increase in gas velocity, an increase in pressure drop, and possible distortion.

Recent model studies and operating experience teaches that between 1 and 12.5 feet per second, the current inlet designs provide good gas distribution across the absorber at or below 3,000 feet per minute inlet velocity. The good gas distribution is provided partially by the resistance of the liquid curtain, falling off the awning to the entering gas. The primary function of the awning is to provide protection against inlet wetness and to provide ample resistance to slow down the entering gas, thus allowing the gas adequate time to redistribute itself across the absorber flow area. At a gas velocity below 12.5 feet per second reasonable gas distortion in the absorber will not approach the critical failure velocity of the mist eliminator.

As the gas velocity increases above 12.5 and approaches 20 feet per second or more, the resistance of the liquid curtain falling off the awning becomes significant and magnifies the effects of gas flow distortion.

Several attempts were made to reduce the resistance of the awning first by introducing a new generation of non intrusive awnings. In these designs, the awning is removed from the inlet's gas stream and placed above the inlet. See for example, U.S. Pat. No. 5,403,523 to Strock, et al.; and U.S. Pat. No. 5,558,818 and 5,648,022 to Gohara et al. Each of these developments contributed to the reduction of the inlet's parasitic pressure drop caused by the intrusion of the original awning into the gas flow path. These designs, however, added 3 feet to the height of the absorber and none of them totally eliminated the effect of the heavy density liquid curtain.

These prior efforts were steps in the right direction to reduce the inlet's parasitic resistance; however, in every case the curtain resistance remained the same. Considering that one inch (water) of pressure drop is evaluated at $1 million over the life of the plant, reduction of the parasitic resistance of the absorber provides a significant competitive edge. Table 1 compares the pressure drop of an inlet with and without awning.

TABLE 1

Comparison of Inlet Pressure Drop
for No Awning and Awning Designs*

| Description | Intrusive Awning | Non-Intrusive Awning | No Awning |
|---|---|---|---|
| Inlet Pressure Drop (Inch Water) | 4.59 | 3.50 | 2.50 |

*Inlet velocity 3,600 feet per minute, liquid flux 60 gpm per square foot, absorber velocity 15 feet per second.

It should also be noted that the prior solutions for absorbers are adapted only for absorbers with flared walls, and do not apply to absorbers with straight, vertical walls.

SUMMARY OF THE INVENTION

It is an object of the present invention to provide an improved gas inlet with a low pressure drop for absorbers having straight, unflared recirculation tanks.

Accordingly, an absorber with a recirculation tank having straight walls between the gas inlet and tank is provided having a perforated tray positioned above the gas inlet across the entire area of the absorber. A ring around the outer edge of the tray lacks perforations, or the perforations are covered. A drip ledge is located on the bottom of the tray around the inner edge of the non-perforated ring. Baffles are positioned over the tray as well. The baffles may extend between the walls of the absorber, or they may only occupy the space over the perforations in the tray.

The invention addresses the potential increase in the tray pressure drop by deviating from the prior art and reduces the pressure drop by using larger diameter holes or perforations. The actual size of the holes or perforations is determined by the size of the ring obstruction to the tray flow area. Reduction of the tray flow area occurs because the ring is an obstruction; blocks holes or perforations therein.

An absorber made in accordance with the invention experiences a low pressure drop at the gas inlet due to the configuration of the tray and baffles. The drip ledge helps to keep the fluid falling from the tray away from entering the inlet. The invention provides a combination of an advanced gas inlet having the sought protection against the formation of "elephant ears" and reduces the liquid curtain to the same density observed with no-awning designs. The new inlet does not promote the formation of thick, high density liquid curtain in the gas path and instead, creates a ring, void of liquid and resistance for accepting and slowing the entering gases. Reducing the incoming gas velocity reduces the resistance between the high velocity incoming gas and the thin liquid curtain falling off of the tray on the awning. As a result, the parasitic pressure drop experienced with awning-equipped inlets is almost completely reduced by approximately 25%. Unlike prior inventions to achieve similar results, the design of the present invention is particularly well adapted for use in absorbers with recirculation tanks and absorber sections having the same diameter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
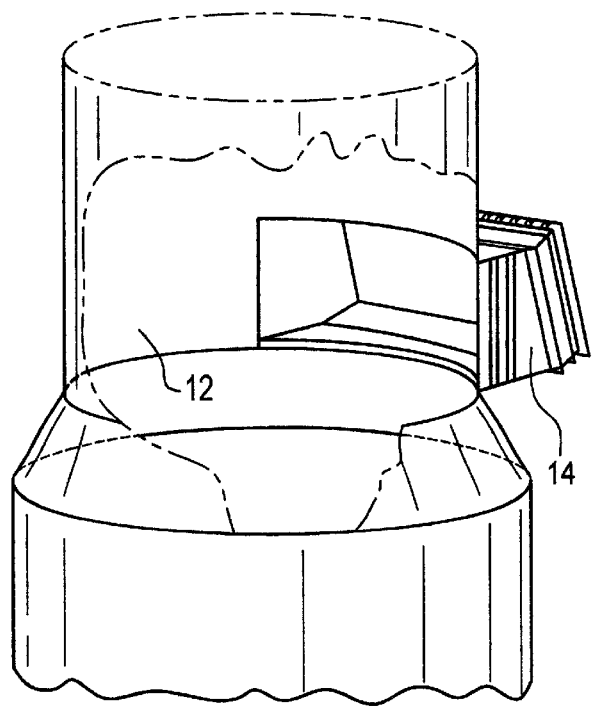
FIG. 1 is a partial schematic illustration of an absorber tower according to the prior art.
Figure 2:
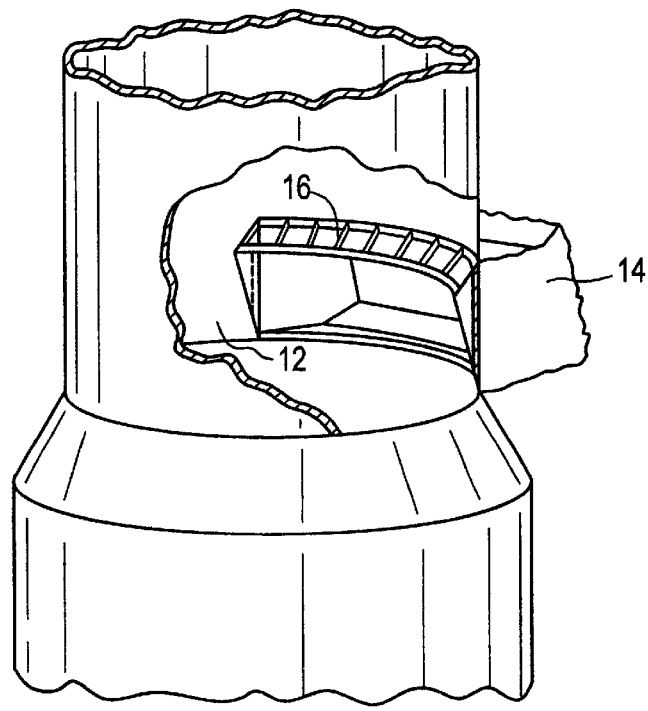
FIG. 2 is a view similar to FIG. 1 of another absorber tower according to the prior art.
Figure 3:
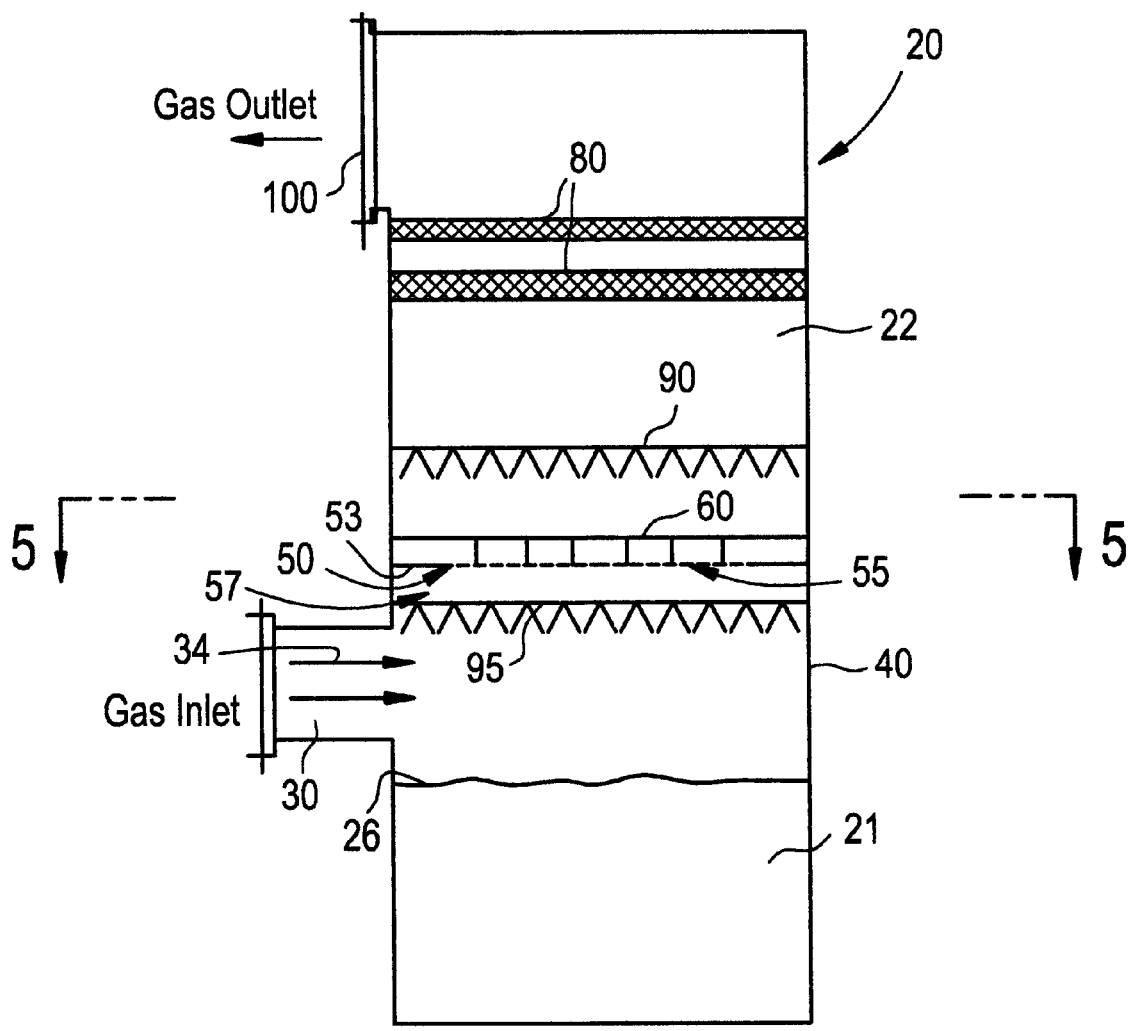
FIG. 3 is a sectional schematic side elevational view of an absorber tower according to the present invention.
Figure 4:
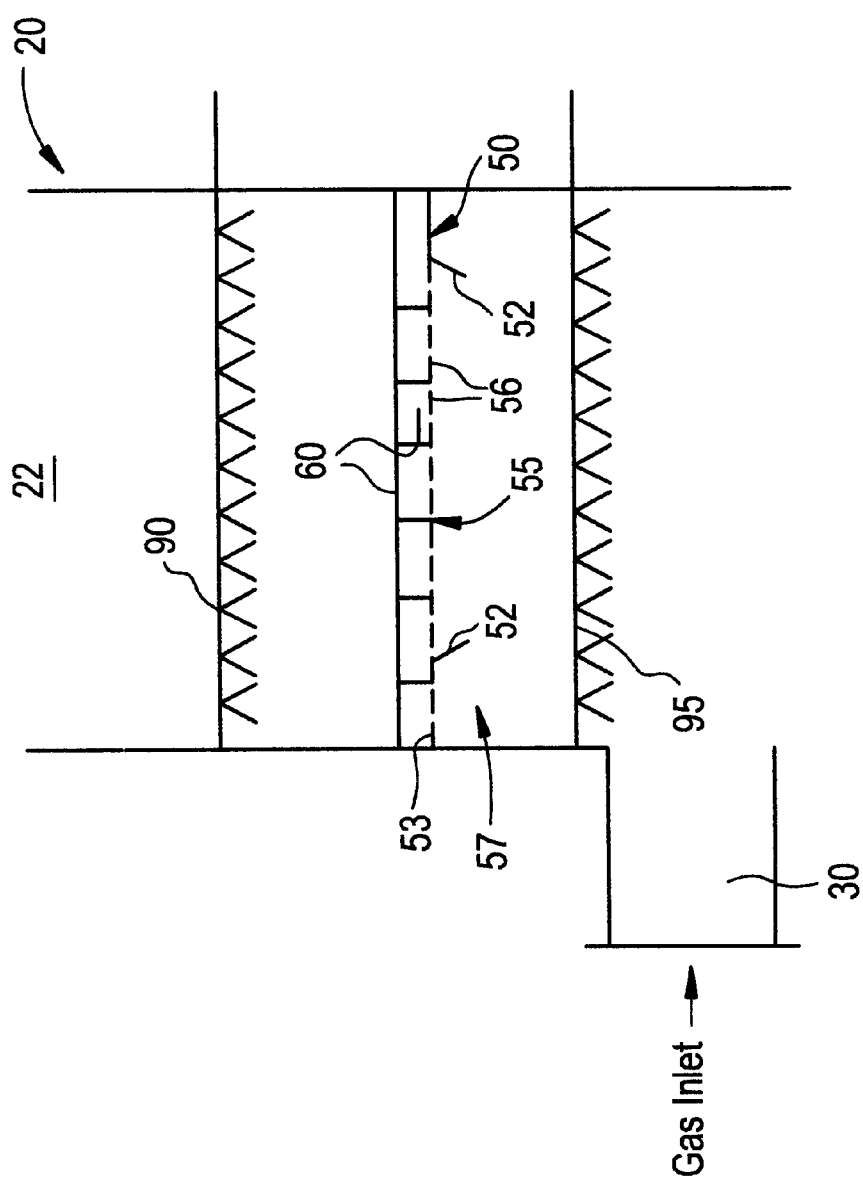
FIG. 4 is an enlarged partial side elevational view of the absorber tower of FIG. 3.

Referring now to the drawings, in which like reference numerals are used to refer to the same or functionally similar elements, FIGS. 3 and 4 show an absorber tower generally designated 20 having a lower tank section 21 connected to an upper absorber section 22 by a transition structure 40 which forms a liquid tight and gas tight pathway for gases and liquids between tank section 21 and absorber section 22.

One immediately noticeable difference possessed by the present invention when compared with the prior art absorbers is that the walls of the tank section 21, transition section 40 and absorber section 22 are straight and continuous.

Tank section 21 contains a slurry made up of absorber liquid, particles and impurities from the absorption process, rising to a level 26 in tank section 21, below transition structure 40. As with conventional absorbers and, in particular, gas absorbers for de-sulfurizing flue gas, absorber section 22 contains a perforated plate or tray 50 which helps divide uprising flue gas with downfalling liquid to intimately communicate the two fluids with each other. A plurality of absorber spray headers 90 are spaced at intervals above tray 50 and receive absorbing fluid in the form of some recycled slurry from tank 21 and fresh absorbing liquid such as limestone, magnesium enhanced limestone, lime slurry or other appropriate scrubbing liquids. Primary and secondary mist eliminators 80 extend across the internal volume of absorber 20, above headers 90. Scrubbed gas leaves through an upper gas outlet 100.

According to the present invention, flue gas initially enters the absorber tower 20 through an inlet housing 30 as schematically shown at arrow 34. Inlet housing 30 has an opening which communicates with transition structure 40 to receive gas 34 into the tower 20.

Figure 5:
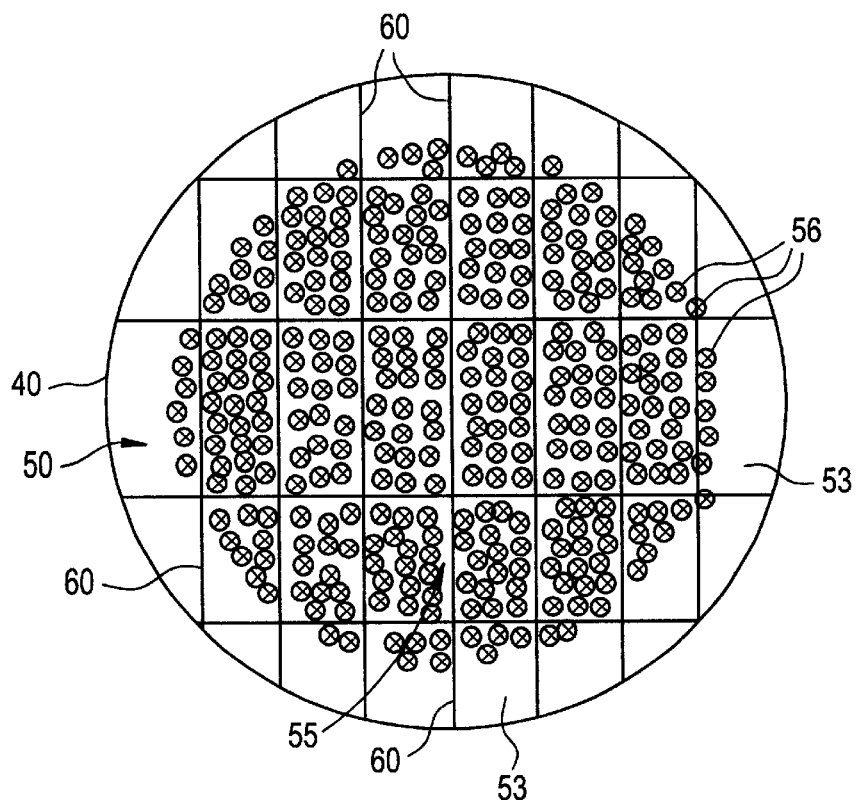
FIG. 5 is a schematic sectional plan view taken along line 5—5 of FIG. 3.
Figure 6:
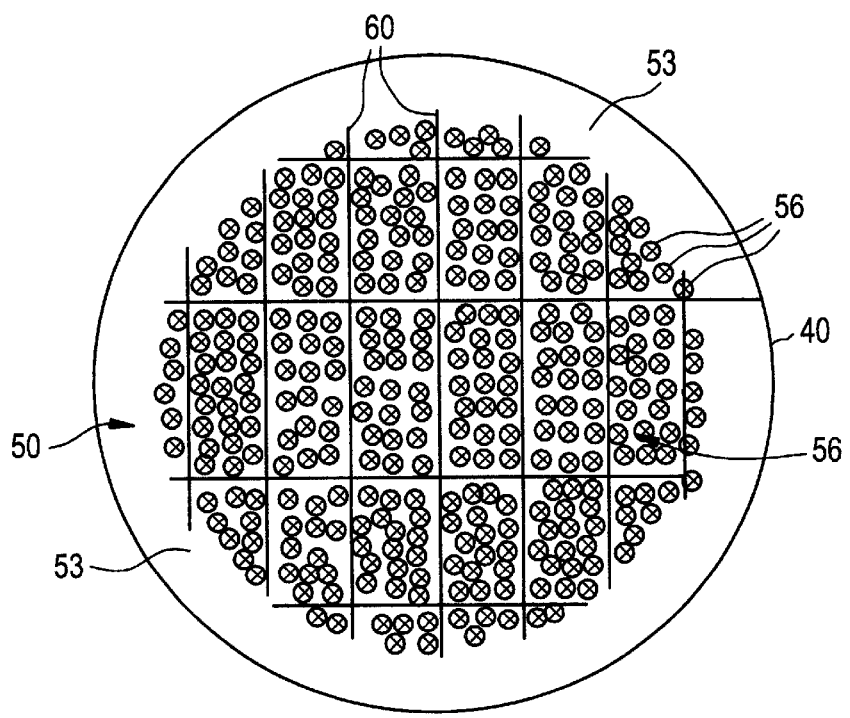
FIG. 6 is a schematic sectional plan view similar to FIG. 5 showing an alternate baffle plate configuration of the invention.

A gas reception ring 57 which is devoid of falling liquid is created in the inlet by either blanking the outer perimeter of existing trays 50 adjacent the absorber wall, or by not punching holes 56 through the trays 50 along the perimeters of new trays 50, as seen in FIGS. 5 and 6. The width of the tray sections 53 having no perforations or holes 56 is preferably between 1 and 5 feet, although it is possible to make the sections narrower or wider subject to the overall absorber diameter. The blocked tray sections 53 make the effective perforated diameter between 2 and 10 feet smaller than a conventional full tray.

As a result of blocking the outer perimeter of the tray 50, the vertically falling liquid is moved toward the center of the absorber, thereby protecting the inlet 30 from becoming wet.

A drip ledge 52 may extend downwardly into the center of the transition section 40 of the absorber 20 from inner edge of the blanked or blocked tray section 53. The drip ledge 52 is preferably about 1 inch long.

Moving the wet/dry interface towards the center of the absorber 20 away from the solid surfaces provides protection against wet/dry interface solids formation common in wet scrubbers. The extension of the drip ledge 52 further provides a natural protection against wetness of the tray bottom caused by the surface tension effect of the liquid. Protection of the gas inlet 30 from the back flow of slurry into the hot gas zone eliminates the need for a separate awning structure. In combination with the reduced-size perforated area 55 of the tray, the drip ledge 52 helps form the gas reception ring 57 in a cylindrical or semi-cylindrical annulus around the walls of the transition stage 40.

Gas entering the gas reception ring 57 from the gas inlet 30 can slow down and transition to the vertical flow direction with less resistance from falling liquid. Thus, this arrangement further eliminates the need for an inlet bustle and utilizes the reception ring 57 to provide the gas with a flow path of low resistance. The falling liquid is intended to have an aspirating effect on the entering gas, thereby promoting gas distribution along the perimeter of the absorber 20. Side shields may also be provided to protect the inlet from splashing as needed, but are not an essential feature of this invention.

The absence of an awning plate protruding into the gas/liquid stream reduces the density of the liquid curtain to a thickness comparable to the no awning arrangement, thereby reducing the liquid curtain parasitic pressure drop to the level of absorbers lacking awnings. Further liquid-free gas reception ring 57 around the perimeter of the transition section 40 permits spreading of the gas in the transition section 40 at a lower velocity. The lower velocity of the gas results in the recovery of velocity pressure expended in prior art absorber designs. Additional pressure recovery is obtained as the gas is cooled and humidified, as in conventional designs.

The low pressure drop experienced at the inlet 30 can be reduced as well by altering the gas inlet 30 width to height aspect ratio. Aspect ratios higher than 1.3 show noticeable reductions in pressure drop in tests performed. Aspect ratios up to 4.0 are suitable for use, while ratios between 2.5 and 3.0 are preferred.

The diameter of the holes or perforations 56 in the trays 50 are preferably between about 1 to 2.5 inches to control the tray pressure drop that may be caused by the blocked ring area.

The size of the tray holes 56 is selected to control the tray 50's pressure drop. As the effective open area of the tray 50 is reduced by the gas reception ring 57, a hole 56 size is selected to produce the same pressure drop as a fully perforated tray 50. Therefore, the reduction achieved in the inlet pressure drop is not offset by an increase in the tray 50 pressure drop.

The baffles 60 over tray 50 can either extend across the entire diameter of the absorber 20, as shown in FIG. 5, or it may only cover the perforated portion 55 of the tray 50, as shown in FIG. 6. The arrangement of the baffles 60 is manipulated to allow drainage of the liquid from the blanked portion 53 of the tray 50 towards the perforations 56 to prevent solids build-up on top of the tray 50 and to maintain the advantage of a clean, easily maintained tray 50. Alternative possibilities include inclining the blanked portion 53 of the tray inward or placing holes in the baffles 60 adjacent the blanked portion 53 of the tray 50.

Advantages of using an absorber 20 according to the invention include the fact that blanking the outer perimeter of the tray 50 reduces the pressure drop of the inlet by an amount equal to the liquid curtain pressure drop; additional pressure drop reduction can be realized as a result of lower gas velocity in the gas reception ring 57 and, as well, better gas distribution. The overall height of the absorber may not increase since the inlet aspect ratio can be manipulated to provide the optimum width to height ratio. The amount of material needed to construct an awning and false bottom are saved, as these components are eliminated. Side shields are optional as well. Finally, the improved inlet and transition section can be retrofit or simply used in new absorbers.

While a specific embodiment of the invention has been shown and described in detail to illustrate the application of the principles of the invention, it will be understood that the invention may be embodied otherwise without departing from such principles.

We claim:

1. A low pressure drop inlet for an absorber of a flue gas scrubber, the absorber of a type having straight, non-flaring walls connecting each of a tank section, a transition section and an absorber section, the inlet comprising:
   a gas inlet opening in a side wall of the absorber adjacent the transition section;
   a tray oriented horizontal between the straight walls, a central portion of the tray having a plurality of perforations therethrough, a perimeter portion of the tray being solid;
   a plurality of baffles positioned above the tray between the straight walls; and
   a gas outlet above the baffles in the side wall of the absorber at the absorber section.

2. The inlet according to claim 1, wherein the perforations in the central portion of the tray are about 1.0 to about 2.5 inches in diameter.

3. The inlet according to claim 1, wherein the gas inlet opening has a width to height aspect ratio of between 1.3 and about 4.0.

4. The inlet according to claim 1, wherein a diameter of the perforations in the tray is selected to maintain pressure drop of the gas flowing through the absorber at substantially the same magnitude as that obtained in the absorber without the solid perimeter portion.

5. The inlet according to claim 1, wherein the plurality of baffles are spacedly positioned over perforated and non-perforated areas of the tray.

6. The inlet according to claim 5, wherein the plurality of baffles positioned over the non-perforated areas of the tray is equipped with perforations to promote drainage of liquid from the tray.

7. The inlet according to claim 3, wherein the aspect ratio is between about 2.5 and about 3.0.

8. A low pressure drop inlet for an absorber of a flue gas scrubber, the absorber of a type having straight, non-flaring walls connecting each of a tank section, transition section and absorber section, the inlet comprising:
   a gas inlet opening in a side wall of the absorber adjacent the transition section;
   a tray oriented horizontal between the straight walls, a central portion of the tray having a plurality of perforations therethrough, a perimeter portion of the tray being a solid non-perforated ring having a width of one to five feet;
   a plurality of baffles positioned above the tray between the straight walls; and a gas outlet above the baffles in the side wall of the absorber at the absorber section.

9. The inlet according to claim 8, further comprising a drip ledge extending and inclined downwardly from a lower surface of the tray around the inner edge of the ring.

10. The inlet according to claim 9, wherein the drip ledge is about 1 inch wide.

11. The inlet according to claim 8, wherein the gas inlet opening has a width to height aspect ratio of between about 1.3 and about 4.0.

12. The inlet according to claim 11, wherein the aspect ratio is between about 2.5 and about 3.0.

13. The inlet according to claim 8, wherein the plurality of baffles are positioned only over the central portion of the tray.

14. The inlet according to claim 13, wherein the perforation in the central portion of the tray are about 1.0 to about 2.5 inches in diameter.

15. A low pressure drop inlet for an absorber of a flue gas scrubber, the absorber of a type having straight, non-flaring walls connecting each of a tank section, transition section and absorber section, the inlet comprising:

a gas inlet opening in a side wall of the absorber adjacent the transition section;

a tray oriented horizontal between the straight walls, a central portion of the tray having a plurality of perforations therethrough, a perimeter portion of the tray being solid;

a drip ledge extending and inclined downwardly from a lower surface of the tray around the inner edge of the perimeter portion;

a plurality of baffles positioned above the tray between the straight walls; and a gas outlet above the baffles in the side wall of the absorber at the absorber section.

16. The inlet according to claim 15, wherein the drip ledge is about 1 inch wide.

* * * * *